June 26, 1962 A. GABOR 3,041,478

SOLID STATE CONTROLLED RECTIFIER NOISE REDUCING CIRCUIT

Filed March 1, 1961

INVENTOR.

ANDREW GABOR

BY Alfred W. Barber

ATTORNEY

United States Patent Office 3,041,478

Patented June 26, 1962

3,041,478
SOLID STATE CONTROLLED RECTIFIER NOISE REDUCING CIRCUIT

Andrew Gabor, Port Washington, N.Y., assignor to Potter Instrument Company, Inc., Plainview, N.Y., a corporation of New York Filed Mar. 1, 1961, Ser. No. 92,529
5 Claims. (Cl. 307—90)

The present invention concerns silicon controlled rectifiers and, in particular, methods of and means for eliminating interfering noise generation by these rectifiers.

The silicon controlled rectifier is a rectifier since it passes current freely in one direction and essentially blocks it in the other direction. The rectifier has the important characteristic that its resistance in its conducting direction may be controlled by the application of a control signal to a third electrode. In other words the silicon controlled rectifier may be made conductive or non-conductive by the application and removal of a control signal. The conduction takes place suddenly and substantially completely at a predetermined control signal voltage. While this sudden conduction characteristic is valuable in many power control circuits, it has one disadvantage in that it tends to generate circuit noise. This circuit noise may cause trouble when it reaches sensitive electronic circuits in the vicinity. Conventional methods of noise reduction are not effective due to the characteristics of the power circuits involved.

It has been found according to the present invention that a simple and effective noise suppression circuit may be used with silicon controlled rectifiers which effectively suppresses the noise caused by the sudden rush of conduction current and without materially affecting the power handling capacity or efficiency of the circuit. This noise suppression circuit consists in a capacitor connected across the rectifier which charges when the rectifier is cut-off and maintains sufficient voltage when the rectifier is turned on, to eliminate the otherwise practically vertical current surge. An inductor and resistor in shunt are connected in series with the rectifier. The resistor supports the capacitor voltage during its discharge and the inductor carries a current substantially unimpeded to the load. The result is that the sharp break in the conduction curve and the practically vertical use in current are rounded sufficiently to reduce generated noise to a low level without substantially affecting the efficiency of the rectifier.

Accordingly the main object of the present invention is to reduce high frequency noise generated in a controlled rectifier circuit.

Another object is to reduce the noise generated by controlled silicon rectifier circuits feeding heavy loads.

Still another object is to reduce the noise generated by controlled silicon rectifier circuits without materially affecting their efficiency or power handling capacity.

These and other objects will be apparent from the detailed description of the invention given in connection with the various figures of the drawing.

Figure 1:
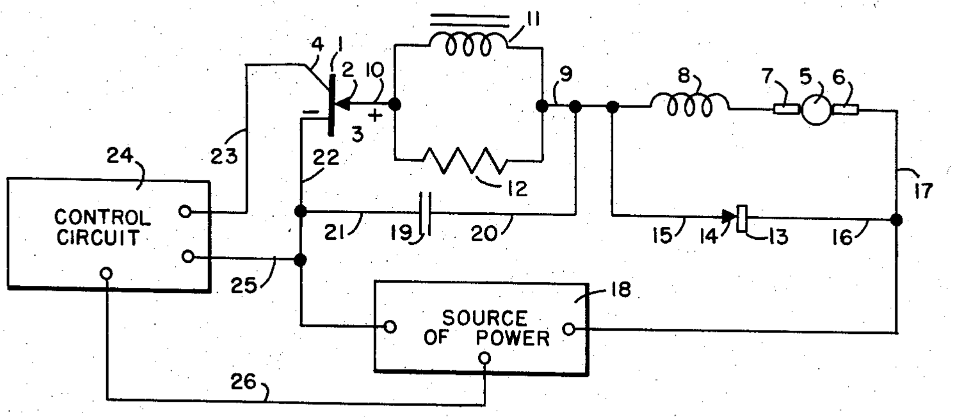
FIG. 1 is a schematic of the preferred form of the present invention.

FIG. 1 shows a silicon controlled rectifier 1 having an anode 2, a cathode 3 and a gate or control electrode 4. In series with anode 2 connected by lead 10 is inductor 11 shunted by resistor 12. In shunt with rectifier 1 and inductor 11 is connected capacitor 19 by means of leads 22, 21, 20 and 9. The rectifier series circuit is continued to a typical load consisting in a direct current motor including series field 8, armature 5 and brushes

6 and 7. A source of power is connected from brush 6 over lead 17 and back to cathode 3 over lead 22. Motor 5, 6, 7, 8 is shunted by rectifier 13—14 connected by means of leads 15 and 16. The primary purpose of rectifier 13—14 is to prevent surges due to the collapse of the magnetic field in the motor when the current is cut-off from damaging rectifier 1. Rectifier 13—14 includes anode 14 connected to field 8 and cathode 13 connected to brush 6. When connected in this direction, forward voltage to the motor appears across rectifier 13—14 in its non-conducting direction while the reverse surges appear in its conducting direction. Thus the forward voltage across the motor is unaffected, while the reverse voltage is shorted out. The silicon controlled rectifier 1 is gated or controlled by means of a control circuit 24 connected over leads 23 and 25 between cathode 3 and control or gate electrode 4. Where the control is synchronous, it may be tied back to the power source 18 by means of lead 26.

Figure 2:
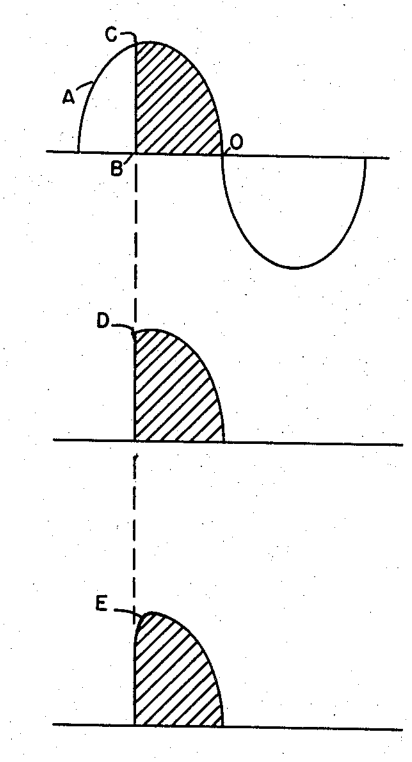
FIG. 2 shows load current diagrams useful in explaining the operation of the present invention.

FIG. 2 shows a curve A of a cycle of alternating current power to be applied (18 in FIG. 1) to the silicon controlled rectifier and controlled to conduct at B so that the shaded portion represents the current flow. It will be seen that without the noise suppressor circuit of the present invention, the load current rises practically vertically from B and breaks sharply at C. This sort of current pattern contains very high frequency components which are the source of high frequency noise. Since the current is large, the power contained in the high frequency noise components may be considerable. In the lower diagrams this conduction curve is isolated and D shows the steep rise and sharp break clearly while the final curve shows the effect of the present noise suppressor circuit at E. This final curve shows a more gradual current rise and a rounded break at E. This more gradual rise and rounded break contain far less noise power than that of the upper curves.

While not intended to limit the invention but merely by way of illustration, satisfactory constants for the present invention are as follows:

| | |
|---|---|
| Inductance | 60 michrohenries |
| Resistance | ½ ohm |
| Capacitance | .22 microfarad |

In order to provide sufficient inductance with very low series resistance, an iron cored inductance may be used for inductance 11. It has been found desirable to provide an air gap in the core of the inductance to prevent saturation of the core on current peaks.

While only one embodiment of the present invention has been shown and described, many modifications will be apparent to those skilled in the art and within the spirit and scope of the invention as set forth in particular in the appended claims.

What is claimed is:

1. In a noise reducing circuit, the combination of, a solid state controlled rectifier including at least an anode, a cathode and a control element; a series circuit including said anode, said cathode, a source of power, a motor and an inductor shunted by a resistor; said inductor-resistor combination being connected at said anode and a capacitor connected between said cathode and the end of said inductor which is opposite to the end connected to said anode.

2. In a noise reducing circuit, the combination of, a solid state controlled rectifier including at least an anode, a cathode and a control element; a series circuit including said anode, said cathode, a source of power, a motor to be energized and an inductor with one end connected to said anode; a low valued resistor connected across said inductor and a capacitor connected between said cathode and the end of said inductor opposite to the end connected to said anode.

3. In a noise reducing circuit, the combination of, a solid state controlled rectifier including at least an anode, a cathode and a control element; a series circuit connected between said anode and said cathode including at least a source of alternating current power, a direct current motor and an inductor, said inductor being connected to said anode; a source of control signals coupled to said alternating current source and to said control element; a low valued resistor connected across said inductor and a capacitor connected from said cathode to the end of said inductor remote from said anode.

4. In a noise reducing circuit, the combination of, a solid state controlled rectifier including at least an anode, a cathode and a control element; a series circuit connected between said anode and said cathode including at least a source of alternating current power, a direct current motor and an inductor, said inductor being connected to said rectifier; a source of control signals coupled to said alternating current source and to said control element; a low valued resistor connected across said inductor, a capacitor connected across said rectifier and inductor, and a diode connected across said motor.

5. In a noise reducing circuit, the combination of, a solid state controlled rectifier including at least an anode, a cathode and a control element; a series circuit connected between said anode and said cathode including at least a source of alternating current, a direct current motor and an inductor, said inductor being connected to said rectifier; a source of control signals coupled to said alternating current source and to said control element; a low valued resistor connected across said inductor and a capacitor connected across said rectifier and inductor.

No references cited.